(12) United States Patent
Komissarchik et al.

(10) Patent No.: US 8,965,877 B2
(45) Date of Patent: Feb. 24, 2015

(54) APPARATUS AND METHOD FOR AUTOMATIC ASSIGNMENT OF INDUSTRY CLASSIFICATION CODES

(71) Applicants: Julia Komissarchik, Hillsborough, CA (US); Edward Komissarchik, Hillsborough, CA (US)

(72) Inventors: Julia Komissarchik, Hillsborough, CA (US); Edward Komissarchik, Hillsborough, CA (US)

(73) Assignee: Glenbrook Networks, Hillsborough, CA (US)

( * ) Notice: Subject to any disclaimer, the term of this patent is extended or adjusted under 35 U.S.C. 154(b) by 189 days.

(21) Appl. No.: 13/828,587

(22) Filed: Mar. 14, 2013

(65) Prior Publication Data
US 2014/0280014 A1    Sep. 18, 2014

(51) Int. Cl.
*G06F 17/30* (2006.01)

(52) U.S. Cl.
CPC ................................ *G06F 17/30867* (2013.01)
USPC .............. 707/710; 707/602; 707/737; 706/12

(58) Field of Classification Search
CPC ..... G06F 17/30705; G06F 17/18; G06N 5/02; G06N 99/005
USPC ............. 707/602, 710, 736, 737, 740; 706/12
See application file for complete search history.

(56) References Cited

U.S. PATENT DOCUMENTS

| | | | |
|---|---|---|---|
| 5,799,276 A | 8/1998 | Komissarchik et al. | |
| 5,855,020 A | 12/1998 | Kirsch | |
| 6,269,370 B1 | 7/2001 | Kirsch | |
| 6,397,185 B1 | 5/2002 | Komissarchik et al. | |
| 6,584,191 B1 | 6/2003 | McPartlan et al. | |
| 6,744,878 B1 | 6/2004 | Komissarchik et al. | |
| 6,850,613 B2 | 2/2005 | McPartlan et al. | |
| 6,963,813 B1 | 11/2005 | Rathei et al. | |
| 7,043,007 B2 | 5/2006 | McPartlan et al. | |
| 7,191,163 B2 | 3/2007 | Herrera et al. | |
| 7,356,522 B2 | 4/2008 | Herrera et al. | |
| 7,395,206 B1 | 7/2008 | Irwin et al. | |
| 7,454,430 B1 | 11/2008 | Komissarchik et al. | |
| 7,756,807 B1 | 7/2010 | Komissarchik et al. | |
| 7,849,045 B2 | 12/2010 | Herrera et al. | |
| 7,937,358 B2 | 5/2011 | Herrera et al. | |
| 8,244,661 B1 | 8/2012 | Komissarchik et al. | |
| 8,296,303 B2 | 10/2012 | Navas | |
| 8,423,495 B1 | 4/2013 | Komissarchik et al. | |
| 8,620,848 B1 | 12/2013 | Komissarchik et al. | |
| 8,682,674 B1 | 3/2014 | Komissarchik et al. | |
| 2006/0117294 A1 | 6/2006 | Vogler | |
| 2009/0089270 A1* | 4/2009 | Haley et al. | 707/4 |
| 2009/0204569 A1* | 8/2009 | Bowden et al. | 707/2 |

(Continued)

OTHER PUBLICATIONS

Abe et al, Robust pointing by XPath language: authoring support and empirical evaluation, Applications and the Internet, 2003, Proceedings, Symposium on Publication Year 2003; pp. 156-165.

(Continued)

*Primary Examiner* — Dennis Truong
(74) *Attorney, Agent, or Firm* — Foley & Lardner LLP; Christopher C. Bolten; Nicola A. Pisano

(57) ABSTRACT

A system and methods for automatically assigning of classification codes to a business based on information about the business collected from the Internet are provided in which data extracted from trawling the Internet is compared to a node structure based on a taxonomy of a selected business classification code system.

15 Claims, 4 Drawing Sheets

(56) References Cited

U.S. PATENT DOCUMENTS

| | | | | |
|---|---|---|---|---|
| 2010/0106752 | A1* | 4/2010 | Eckardt et al. | 707/805 |
| 2012/0185373 | A1* | 7/2012 | Grody | 705/37 |
| 2012/0191716 | A1* | 7/2012 | Omoigui | 707/740 |
| 2012/0290330 | A1* | 11/2012 | Coleman et al. | 705/4 |
| 2014/0172754 | A1* | 6/2014 | He et al. | 706/12 |
| 2014/0280014 | A1 | 9/2014 | Komissarchik et al. | |

OTHER PUBLICATIONS

Gautam et al, Link contexts in classifier-guided topical crawlers, Knowledge and Data Engineering, IEEE Transactions on vol. 18, Issue 1, Jan. 2006 pp. 107-122 Digital Object Identifier 10.1109/TKDE.2006.12.

Kunhui, Estimation of Optimal Topic Spider Strategy by Use of Decision Trees, Control and Automation, 2007. ICCA 2007, IEEE International Conference on May 30, 2007-Jun. 1, 2007 pp. 2806-2809 Digital Object Identifier 10.11 0911CCA.2007.4376873.

Lingras et al, Adaptive hyperlinks using page access sequences and minimum spanning trees, Fuzzy Systems Conference, 2007. FUZZ-IEEE 2007. IEEE International Jul. 23-26, 2007 pp. 1-6Digital Object Identifier 10.11 09/FUZZY.2007.4295422.

Synytskyy et al, Robust Multilingual Parsing Using Island Grammars, Oct. 2003 CASCON '03: Proceedings of the 2003 conference of the Centre for Advanced Studies on Collaborative research Publisher: IBM Press ACM Portal.

Zhu, An Algorithm OFC for the Focused Web Crawler, Machine Learning and Cybernetics, 2007 International Conference on vol. 7, Aug. 19-22, 2007 pp. 4059-4063 Digital Object Identifier 10.11 09/ICMLC.2007.4370856.

* cited by examiner

APPARATUS AND METHOD FOR AUTOMATIC ASSIGNMENT OF INDUSTRY CLASSIFICATION CODES

FIELD OF THE INVENTION

The present invention relates generally to the field of industry classification and particularly to a system of automatic assignment of classification codes to businesses based on detailed information about businesses collected from the Internet.

BACKGROUND OF THE INVENTION

Business classification is used in many different ways for fiscal, financial, sales, marketing and other purposes and activities. It helps businesses judge which companies should be targeted to become customers or vendors of a particular product or service. One popular use of business classifications is to build companies sales pipelines by focusing on likely prospective customers.

Business classification systems evolve with time depending on business trends. For example, the development of the computers led to a significant expansion of the Standard Industry Code ("SIC") classification used in the United States to covering multiple areas related to computing. Typically, governments require businesses to self-assign classification codes, a process that is prone to error and omission. This especially can be the case if a company has multiple lines of business or if the primary focus of the business changes over time.

The Internet constitutes a new source of information to determine and assign business classification codes for a company. However, some sources are better suited than others to serve this purpose. For example, when a company applies for a place in business directory it quite often provides a description of the company's line of business. A company web site is probably the richest and most detailed source of information for automatic classification code assignment.

Using data mined from the Internet for the task of determining and assigning business classification codes has been known and used for a number of years. Such information is especially important for companies that provide business information to other companies. For example, InfoGroup has been doing manual and semi-automatic SIC and North American Industry Classification System ("NAICS") code assignments using on-line company descriptions for a number of years. More recently other types of businesses have started doing this, such as insurance companies that assess risk for business insurance based on a company's business classification.

For example, US Patent Publication No. US 20120290330 A1, entitled "System and method for web-based industrial classification", describes methods for determining risk-related business classification using business information obtained from the Internet. That publication describes a method that combines manual classification code assignment with classic natural language processing techniques and machine learning based clusterization.

A key drawback of methods such as described in the foregoing publication, however, is the complex nature of web pages present on the Internet. In particular, to be useful for the code assignment task, proper attribution must be made of the information contained on the web page(s) to a particular business entity, as well as a process for resolving contradictory information contained on different web pages. For example, the presence on web pages of extraneous elements, such as advertisements, provides a high level of noise. Without resolving such noise, the resulting clusterization and corresponding code assignments may be highly inaccurate.

Additional difficulties arise when a company has a multiple different lines of business, which is typical for large corporations, especially multi-national corporations. The inability to account for the interference between descriptions of different lines of business creates an additional high level of noise that may result in unreliable business classification code assignments, especially where a machine learning technique is used. Accordingly, in order to distinguish one line of business from another, or one corporate division from another, a more in-depth analysis and classification of web pages is needed than is currently available using previously-known methods and systems. None of these drawbacks are addressed by previously-known computer-assisted business classification code assignment systems.

In view of the many drawbacks of previously-known systems and methods, it would be desirable to provide apparatus and methods that overcome such drawbacks. In particular, it would be desirable to provide a computer-assisted business classification code assignment system and methods that can mine data presented on an Internet web page and correctly attribute information relevant to the company of interest while rejecting extraneous information, such as advertising contained on the web page.

It further would be desirable to provide a computer-assisted business classification code assignment system and methods that can mine data presented on an Internet web page and differentiate and properly attribute information relevant to the business division of the company of interest from information relating to other divisions of the same company.

SUMMARY OF THE INVENTION

In view of the aforementioned drawbacks of previously-known systems and methods, the present invention provides a system and methods for automatically assigning business classification codes to businesses using information published on the Internet.

The present invention further provides a computer-assisted business classification code assignment system and methods that mine data presented on an Internet web page and properly attributes information relevant to the company of interest while rejecting extraneous information. In a preferred embodiment, a computer system is programmed to trawl the Internet to extract information relevant to a company of interest, segregate that data according to one or more classification structures based on the business classification code taxonomy to generate word histograms, and then use a term frequency-inverse document frequency ("TF-IDF") weighing scheme to identify matches between the classification structure and extracted data that exceed a predetermined threshold. The N-best matches resulting from matches between the classification structure based on the word histograms and the results of the TF-IDF analysis then are combined and output as the proposed business classification code assignment for the company of interest.

In accordance with another aspect of the present invention, a computer-assisted business classification code assignment system and methods are provided that mine data presented on an Internet web page and attribute information relevant to the company of interest while rejecting advertising and other extraneous elements contained on the web page.

In accordance with yet another aspect of the present invention, a computer-assisted business classification code assignment system and methods are provided that mine data presented on an Internet web page, including dynamically generated web pages, and differentiate and attribute information relevant to the business division of the company of interest from information relating to other divisions of the company

BRIEF DESCRIPTION OF THE DRAWINGS

Further features of the invention, its nature and various advantages will be apparent from the accompanying drawings and the following detailed description of the preferred embodiments, in which.

DETAILED DESCRIPTION OF THE PREFERRED EMBODIMENTS

Figure 1:
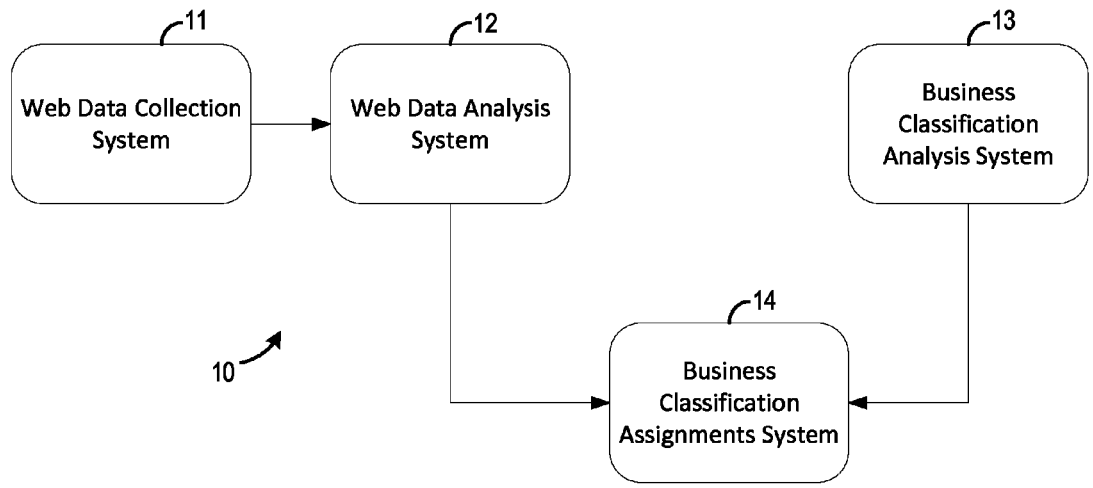
FIG. 1 is a schematic diagram of the system of the present invention, comprising software programmed to operate on a computer system of conventional design having Internet access.

Referring to FIG. 1, system 10 for automatic assignment of industry classification codes to businesses is described. The system comprises web data collection system 11, business classification code analysis system 12, web data analysis system 13 and business classification code assignment system 14, each of which is described herein below. As used in this specification, the terms "web" and "Internet" are used interchangeably. Further, it is to be understood that the system of the present invention may be implemented using well-known computer programming techniques to program a computer system of known design having access to the Internet.

Web Data Collection System

Web data collection system 11 collects relevant information from the Internet and employs on a system such as described in commonly assigned U.S. Pat. Nos. 7,454,430, 7,756,807, and 8,244,661, the entireties of which are incorporated herein by reference. As described in the specifications of these incorporated patents and depicted in FIG. 2, web data collection system includes three distinct components: deep web trawling component 20; web page analysis component 21; and, contexts extraction/fact extraction component 22. A description of each of these components and corresponding algorithms is presented in the specifications of the incorporated patents. Accordingly, described here is how these components generally are used to collect information relevant to the task of assigning business classification codes to a particular business, its products and services.

The major sources for information relevant to business classification typically include websites sponsored or maintained by the company itself, governmental bodies, newspapers and industry analysts. Recently, relevant information also has begun appearing on social networking sites, such as Facebook and Twitter, and on review sites, such as Yelp and Angie's list. A difficulty in accessing these sites, and especially the review sites, is that they attempt to discourage use of their information for commercial purposes by blocking web crawlers. Furthermore, sites such as Yelp have information primarily about business to consumer companies like restaurants, plumbers, doctors, etc. On the other hand businesses, business associations and government bodies web sites, and to some extent newspapers typically do not have restrictions on collecting information from their sites and in some cases welcome it.

Figure 2:
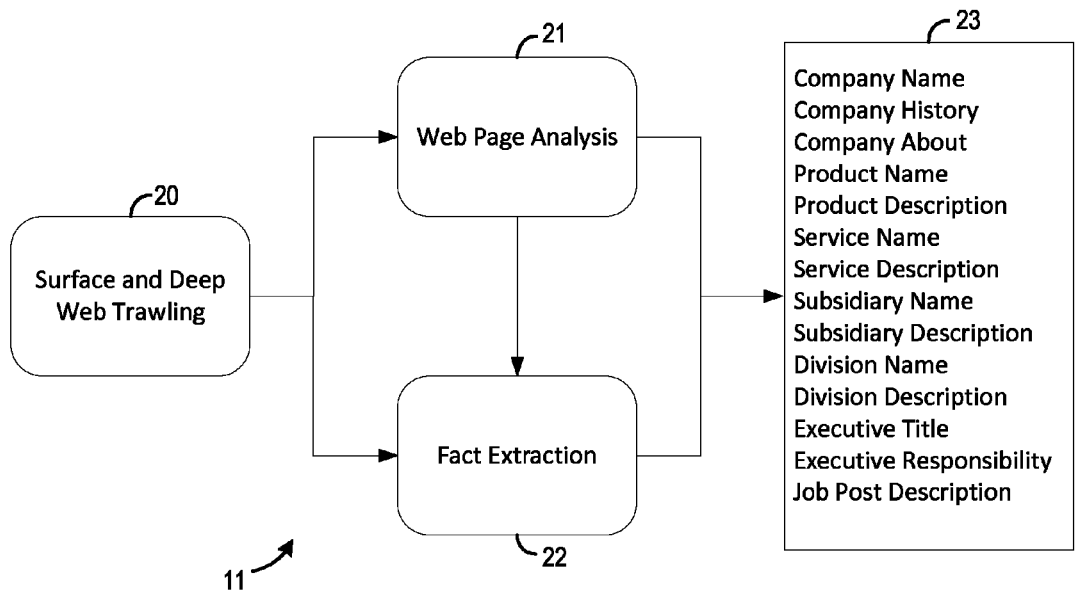
FIG. 2 is a schematic diagram of an exemplary web data collection system.

Information relevant to business classification consists of at least the following categories (this list includes US-specific agencies like SEC, but similar bodies exist in other countries):

Company Website—Company History, About Us pages
Company Website—Press Releases
Company Website—Annual Reports, SEC or other government financial filings
Company Website—Management Team page
Business Association Website—Description of the association page
Business Association Website—List of member companies
Security and Exchange Commission Website—SEC Filings
Stock Exchange Website—Public companies Financial Reports
Secretary of State Website—List of companies with some classification
Press Release Publication Website—Press Releases
Newspaper Website—Articles about businesses As shown in FIG. 2, trawling of these sources may produce a set of web pages that contain business description, business structure including subsidiaries, management team information including occupation (the latter is especially important for detection of corporate divisions and product lines), products and services description. Next, data elements 23 are extracted from the trawled pages using web page analysis component 21 and context extraction/fact extraction component 22, which in an exemplary embodiment include:

Company Name
Company History
Company About
Product Name
Product Description
Service Name
Service Description
Subsidiary Name
Subsidiary Description
Division Name
Division Description
Executive Title
Executive's Responsibility
Job Post Description Each of data elements 23, by itself and in combination with other data elements from the list, provides structural and linguistic information that is used in the assignment system of the present invention. However, before matching data elements 23 to company codes employed in the desired business classification code system of interest, both the company data and the code data preferably should be expressed in an equivalent manner, which is the function of the next system component, described below.

Business Classification Code Analysis System

Figure 3:
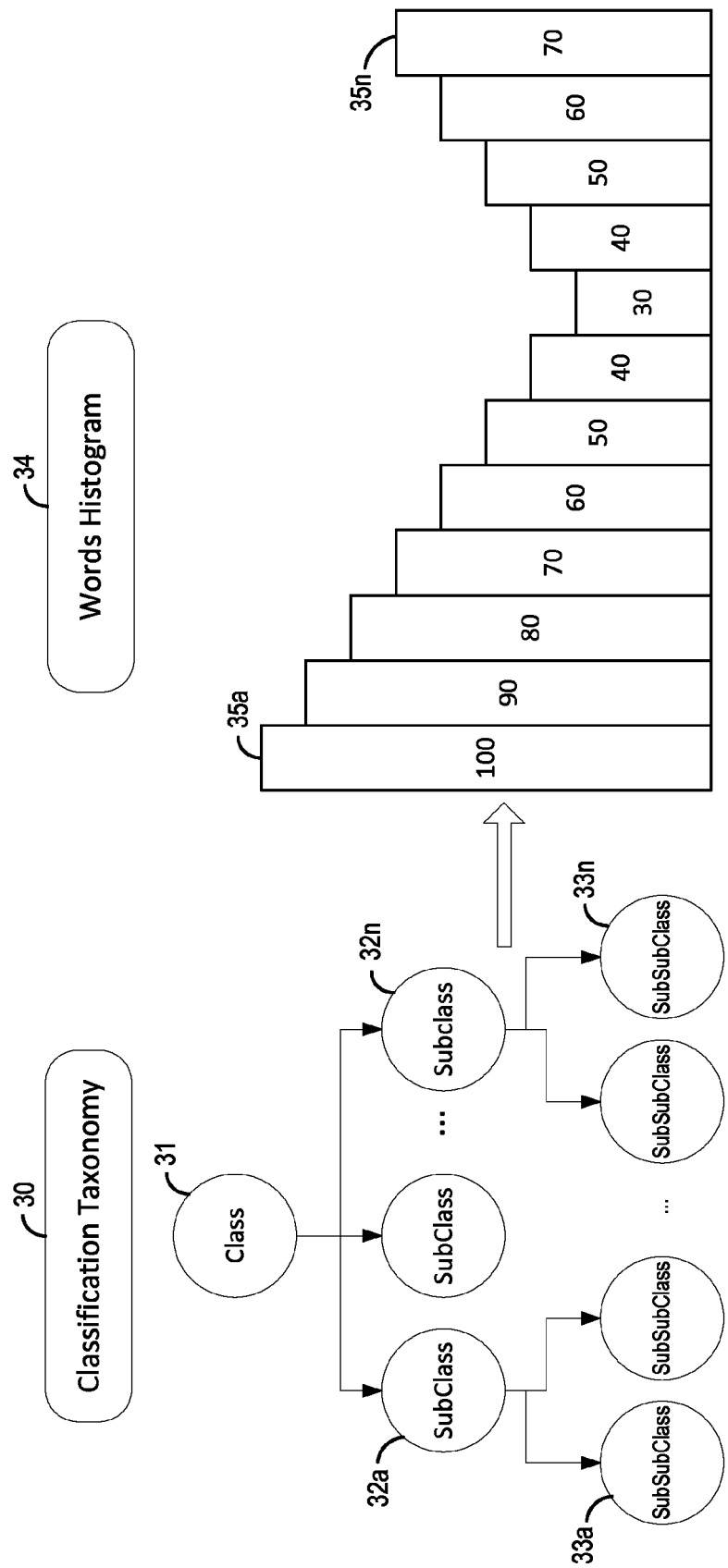
FIGS. 3A and 3B are respectively, a diagram depicting a taxonomy of a business classification code analysis system such as SIC or NAICS and a word histogram showing correspondence between words extracted during operation of the web collection system and the selected taxonomy.

Referring now to FIGS. 3A and 3B, business classification code analysis system 13 is described, which takes an arbitrary business classification system and converts it into a structure suitable for use in code assignment. There are several business classification systems currently in use around the world. In the United States, the two most widely used systems are SIC and NAICS.

Business classification systems such as SIC and NAICS are built as taxonomies—a tree of notions with child nodes constituting a more detailed notion than the notion in the parent node. SIC has 4 levels of depth while NAICS has 6. Similar systems are used in other countries. Each node in the taxonomy has a description of the notion associated with it.

Structure 30 used in business classification code analysis system 13 is built as follows: For each node 31 in the taxonomy, all descriptions from all nodes 32a ... 32n in the corresponding sub-tree are concatenated into one description (FIG. 3A). Then for each non-stop word bigram and trigram, 31, 32a, 33a, etc., taxonomy word histogram 34 is built, as depicted in FIG. 3B. Taxonomy word histogram 34 then is used in web data analysis system 12, as described below, to determine n-best matches of data elements 23 of a selected company to the chosen taxonomy.

Web Data Analysis System

Figure 4:
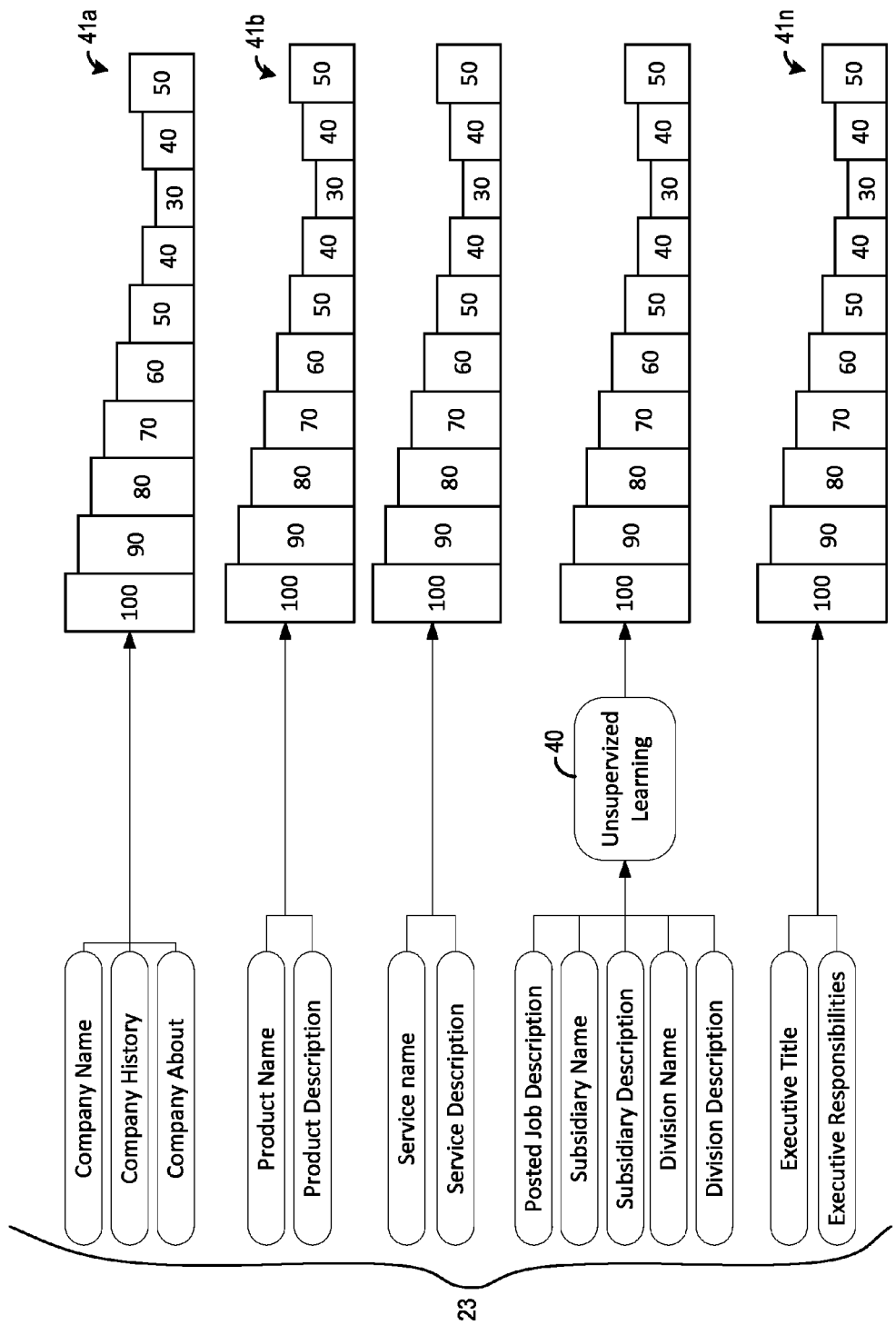
FIG. 4 is a schematic diagram showing exemplary results for a plurality of classification schemes and data obtained using the web data analysis system of the present invention.

Referring now to FIG. 4, web data analysis system 12 starts with data elements 23 collected by web data collection system 11.

In many cases subsidiaries or divisions are clearly defined in company filings and in the management team page. When that is not the case, additional analysis based on classic unsupervised learning techniques 40 may be used to cluster data elements based on the text matching metrics. Each cluster is then marked as a pseudo-division.

After subsidiaries, divisions and pseudo-divisions are determined, this information is used as tags for differentiating the data contained in corresponding press releases, news articles and other data elements. Next, extracted word histograms 41a ... 41n are generated for each entity (company, subsidiary, division, product or group of product and service or group of services). These extracted word histograms are used in business classification code assignment system 14, described below.

Business Classification Codes Assignment System

Figure 5:
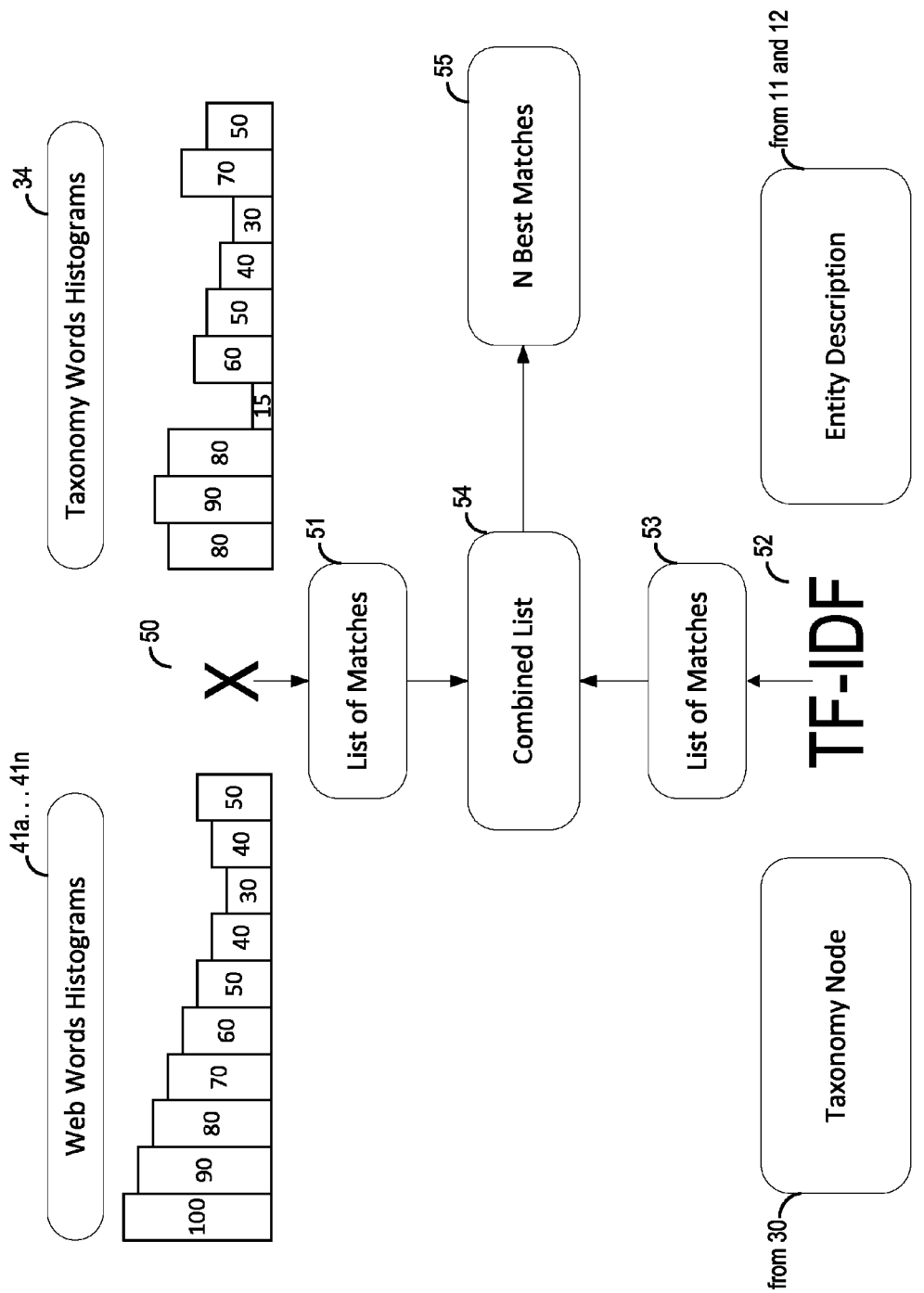
FIG. 5 is a schematic diagram depicting combination of the matching results obtained using the systems and methods of the present invention to output business classification code assignments.

Referring now to FIG. 5, business classification code assignment system 14 takes the results of web data analysis system 12 for a particular company and finds the N-best matches to the results of business classification code analysis system 13 for the company as a whole, for its subsidiaries, divisions, and if needed individual products and services.

For each entity (subsidiary, division, product, service) that was identified by web data analysis system 12 and each node structure 30, normalized scalar product 50 of corresponding taxonomy word histograms and extracted word histograms is calculated. Pairs 51 for which the calculated result exceeds a predetermined threshold are saved. Next, for each node in structure 30 corresponding to the selected business classification code taxonomy, and each entity, term frequency-inverse document frequency ("TF-IDF") distance 52 is calculated for the description of the node and the data provided for that entity by web data collection system 11 and web data analysis system 12. Matches 53 exceeding a pre-determined threshold are saved.

For each entity, nodes from both lists of matches 51 and 53 are combined at 54. First, the weights of the matches determined by each of the methods are normalized. Then, if there are common matches, these are assigned additional weight. Combination of the lists is performed using morphological analysis methods, such as stemming, to account for the multiple ways in which a particular term may occur in the texts. The additional weight is calculated as a sum of the reverse ranks of the matches in corresponding lists, and then normalized so that the maximum weight is no larger than a predefined constant, typically 0.25. The N-best matches are then output at 55 as the business classification code to be assigned to the company of interest, where generally N=1 or 2.

While preferred illustrative embodiments of the invention are described above, it will be apparent to one skilled in the art that various changes and modifications may be made therein without departing from the invention. The appended claims are intended to cover all such changes and modifications that fall within the true spirit and scope of the invention.

What is claimed is:

1. A system for automatically assigning a business classification code to a company, comprising:
one or more processing units configured to:
trawl the Internet, locate and extract web data relevant to the company;
generate a business classification analysis with a node structure corresponding to a selected business classification code system and to compute a taxonomy word histogram based on the node structure;
generate an extracted word histogram corresponding to the presence of selected web data elements within the extracted web data relevant to the company; and
determine a business classification code assignment with a first list of matches for the business classification code for the company by comparing a normalized scalar product of the taxonomy word histogram and the extracted word histogram to a predetermined threshold.

2. The system of claim 1, wherein the one or more processing units are further configured to compute a TF-IDF distance for each taxonomy node and entity description to determine a second list of matches for the business classification code for the company.

3. The system of claim 2, wherein the one or more processing units are further configured to combine the first list of matches and the second list of matches to determine and output a list of N-best matches for the business classification code for the company.

4. The system of claim 1, wherein the selected business classification code system SIC or NAICS.

5. The system of claim 1, wherein the node structure comprises n-grams of descriptions corresponding to descriptions employed within the selected business classification code taxonomy.

6. The system of claim 1, wherein the system comprises a web trawling component, a web page analysis component and a fact extraction component.

7. The system of claim 1, wherein the one or more processors are configured to locate and extract web data relevant to the company including the company name, company history, product name and product description.

8. The system of claim 1, wherein the one or more processing units are configured to trawl websites including at least one of a company website, a governmental body website, an industry analyst website, a social networking website and a review website.

9. A non-transitory computer-readable storage medium having instructions stored thereon, which, when executed by one or more processors of one or more computing devices, cause the one or more processors to perform operations comprising:
trawling the Internet to locate and extract data relevant to a company;
generating a node structure corresponding to a selected business classification code system and computing a taxonomy word histogram based on the node structure;

generating an extracted word histogram corresponding to the presence of selected data elements within the extracted data relevant to the company; and determining a first list of matches for the business classification code for the company by comparing a normalized scalar product of the taxonomy word histogram and the extracted word histogram to a predetermined threshold.

10. The non-transitory computer-readable storage medium of claim 9, further comprising computing a TF-IDF distance for each taxonomy node and entity description to determine a second list of matches for the business classification code for the company.

11. The non-transitory computer-readable storage medium of claim 10, further comprising combining the first list of matches and the second list of matches to determine and output a list of N-best matches for the business classification code for the company.

12. The non-transitory computer-readable storage medium of claim 9, wherein the selected business classification code system SIC or NAICS.

13. The non-transitory computer-readable storage medium of claim 9, wherein the node structure is generated by concatenating successive subclasses of descriptions employed within the selected business classification code taxonomy.

14. The non-transitory computer-readable storage medium of claim 9, wherein data extracted relevant to the company includes the company name, company history, product name and product description.

15. The non-transitory computer-readable storage medium of claim 9, wherein trawling the Internet to locate and extract data relevant to the company comprises trawling at least one of a company website, a governmental body website, an industry analyst website, a social networking website and a review website.

* * * * *